US008165910B2

(12) United States Patent
Veit

(10) Patent No.: US 8,165,910 B2
(45) Date of Patent: **\*Apr. 24, 2012**

(54) METHOD AND SYSTEM FOR PRICE PLANNING

(75) Inventor: Thomas Veit, Kirchheimbolanden (DE)

(73) Assignee: SAP Aktiengesellschaft, Walldorf (DE)

( \* ) Notice: Subject to any disclaimer, the term of this patent is extended or adjusted under 35 U.S.C. 154(b) by 1411 days.

This patent is subject to a terminal disclaimer.

(21) Appl. No.: 10/927,537

(22) Filed: Aug. 26, 2004

(65) Prior Publication Data

US 2005/0197902 A1  Sep. 8, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 99/00* (2006.01)
(52) U.S. Cl. .............. 705/7.29; 705/1.1; 705/14.13; 705/14.35; 705/26.8; 705/400
(58) Field of Classification Search ............... 705/1, 26, 705/400, 10, 20, 28, 14, 16, 1.1, 7.31, 7.35, 705/26.1
See application file for complete search history.

(56) References Cited

U.S. PATENT DOCUMENTS

| | | | |
|---|---|---|---|
| 5,400,253 A | 3/1995 | O'Connor | |
| 5,758,327 A | 5/1998 | Gardner et al. | |
| 5,873,069 A | 2/1999 | Reuhl et al. | |
| 5,930,771 A | 7/1999 | Stapp | |
| 5,974,418 A | 10/1999 | Blinn et al. | |
| 6,076,071 A * | 6/2000 | Freeny, Jr. | 705/14.1 |
| 6,151,608 A | 11/2000 | Abrams | |
| 6,272,472 B1 | 8/2001 | Danneels et al. | |
| 6,484,149 B1 | 11/2002 | Jammes et al. | |
| 6,507,851 B1 | 1/2003 | Fujiwara et al. | |
| 6,513,016 B1 * | 1/2003 | Freeny, Jr. | 705/26 |
| 6,553,352 B2 | 4/2003 | Delurgio et al. | |
| 6,609,101 B1 * | 8/2003 | Landvater | 705/10 |
| 6,678,695 B1 | 1/2004 | Bonneau et al. | |
| 6,910,017 B1 | 6/2005 | Woo et al. | |
| 6,980,966 B1 | 12/2005 | Sobrado et al. | |
| 7,080,066 B1 * | 7/2006 | Scheurich et al. | 1/1 |
| 7,082,066 B2 | 7/2006 | Yamada | |

(Continued)

FOREIGN PATENT DOCUMENTS

JP  2004-030343  1/2004

(Continued)

OTHER PUBLICATIONS

Mantrala et al., "A Decision-Support System That Helps Retailers Decide Order Quantities and Markdowns for Fashion Goods", May-Jun. 2001(pp. S146-S165) 20 pgs.*

(Continued)

*Primary Examiner* — John Hayes
*Assistant Examiner* — Freda A Nelson
(74) *Attorney, Agent, or Firm* — Foley & Lardner LLP

(57) ABSTRACT

A method for generating a price planning schedule includes receiving price planning input from at least one of an automated pricing engine and a manual pricing engine. The method further includes generating a price planning schedule based on the price planning input and a price planning budget associated with the price planning input.

30 Claims, 9 Drawing Sheets

U.S. PATENT DOCUMENTS

| | | | |
|---|---|---|---|
| 7,085,734 B2 * | 8/2006 | Grant et al. ............... | 705/20 |
| 7,092,929 B1 * | 8/2006 | Dvorak et al. ............ | 705/28 |
| 7,117,165 B1 | 10/2006 | Adams et al. | |
| 7,139,731 B1 | 11/2006 | Alvin | |
| 7,155,402 B1 | 12/2006 | Dvorak | |
| 7,240,019 B2 * | 7/2007 | Delurgio et al. ........... | 705/10 |
| 7,249,033 B1 | 7/2007 | Close et al. | |
| 7,251,615 B2 | 7/2007 | Woo | |
| 7,308,421 B2 | 12/2007 | Raghupathy et al. | |
| 7,373,314 B2 | 5/2008 | Aliabadi et al. | |
| 7,379,890 B2 | 5/2008 | Myr et al. | |
| 7,383,990 B2 | 6/2008 | Veit | |
| 7,516,083 B1 | 4/2009 | Dvorak et al. | |
| 2001/0039519 A1 | 11/2001 | Richards | |
| 2002/0023500 A1 | 2/2002 | Chikuan et al. | |
| 2002/0026368 A1 | 2/2002 | Carter, III | |
| 2002/0078159 A1 | 6/2002 | Petrogiannis et al. | |
| 2002/0087583 A1 | 7/2002 | Morgan et al. | |
| 2002/0107713 A1 | 8/2002 | Hawkins | |
| 2002/0116348 A1 | 8/2002 | Phillips et al. | |
| 2002/0147668 A1 | 10/2002 | Smith et al. | |
| 2002/0184116 A1 | 12/2002 | Tam et al. | |
| 2003/0023500 A1 | 1/2003 | Boies et al. | |
| 2003/0027437 A1 | 2/2003 | Worz | |
| 2003/0028437 A1 | 2/2003 | Grant et al. | |
| 2003/0046195 A1 | 3/2003 | Mao | |
| 2003/0083961 A1 | 5/2003 | Bezos et al. | |
| 2003/0120546 A1 * | 6/2003 | Cusack et al. ............ | 705/16 |
| 2003/0120579 A1 | 6/2003 | Carter, III | |
| 2003/0130883 A1 | 7/2003 | Schroeder et al. | |
| 2003/0158791 A1 | 8/2003 | Gilberto et al. | |
| 2003/0172007 A1 | 9/2003 | Helmolt et al. | |
| 2003/0200156 A1 | 10/2003 | Roseman et al. | |
| 2003/0212617 A1 | 11/2003 | Stone et al. | |
| 2003/0216969 A1 * | 11/2003 | Bauer et al. ............... | 705/22 |
| 2003/0229502 A1 | 12/2003 | Woo | |
| 2004/0019494 A1 * | 1/2004 | Ridgeway et al. ......... | 705/1 |
| 2004/0098358 A1 | 5/2004 | Roediger | |
| 2004/0117377 A1 | 6/2004 | Moser et al. | |
| 2004/0162763 A1 | 8/2004 | Hoskin et al. | |
| 2004/0186783 A1 | 9/2004 | Knight et al. | |
| 2004/0210542 A1 * | 10/2004 | Sweeney .................. | 705/400 |
| 2004/0220861 A1 | 11/2004 | Morciniec et al. | |
| 2004/0267674 A1 | 12/2004 | Feng et al. | |
| 2004/0267676 A1 | 12/2004 | Feng et al. | |
| 2005/0055283 A1 | 3/2005 | Zarovinsky | |
| 2005/0060270 A1 | 3/2005 | Ramakrishnan | |
| 2005/0075949 A1 | 4/2005 | Uhrig et al. | |
| 2005/0086122 A1 | 4/2005 | Cirulli et al. | |
| 2005/0096963 A1 | 5/2005 | Myr et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0197851 A1 | 9/2005 | Veit | |
| 2005/0197896 A1 | 9/2005 | Veit et al. | |
| 2005/0197902 A1 | 9/2005 | Veit | |
| 2005/0197941 A1 | 9/2005 | Veit | |
| 2005/0197972 A1 | 9/2005 | Kettner et al. | |
| 2005/0218218 A1 | 10/2005 | Koster | |
| 2006/0036507 A1 | 2/2006 | Pujar et al. | |
| 2006/0112099 A1 | 5/2006 | Musgrove et al. | |
| 2006/0143027 A1 | 6/2006 | Jagannathan et al. | |
| 2006/0190308 A1 | 8/2006 | Janssens et al. | |
| 2007/0226064 A1 | 9/2007 | Yu et al. | |
| 2008/0243578 A1 | 10/2008 | Veit | |

FOREIGN PATENT DOCUMENTS

| | | | |
|---|---|---|---|
| WO | WO 0213101 A1 * | 2/2002 | |

OTHER PUBLICATIONS

Elmaghraby, Wedad; Gulcu, Altan; Keskinocak, Pinar; "Analysis of a Price Markdown", 2001, pp. 170-171.*

Mantrala, Murali K.; Tandon, Mridul K; "An Implementable Approach for Optimizing Department Store Markdown Decisions", Apr. 1994, Stores, v76n4, pp. RR1-RR6.*

Mantrala, Murali K; Rao, Surya; "A Decision-Support System that Helps Retailers Decide Order Quantities and Markdowns for Fashion Goods", May/Jun. 2001; Interfaces, p. S146-S165.*

U.S. Appl. No. 60/374,892, filed Apr. 22, 2002, Krajec, Russell.

ProfitLogic, available at http://web.archive.org/web/20020603 11838/http://profitlogic.com/, available at least by Apr. 15, 2005 (22 pp.).

Subrahmanyan et al., "Developing optimal pricing and inventory policies for retailers who face uncertain demand", *Journal of Retailing*, vol. 72, No. 1, Spring, 1996 (p. 7 (24)).

"Beyond Markdown Management", summer/autumn 03, the 4caster, Issue 4, vol. 2, 4 pages.

"Retailers Manage Markdown Challenges Using i2 Solutions", Jan. 13, 2003, NFR 92nd Annual Convention & Expo, 2 pages.

Abraham et al., "An Implemented System for Improving Promotion Productivity Using Store Scanner Data", Marketing Science, Summer 1993, vol. 12, No. 3, pp. 248-269.

Author unknown, "Staffware and Biomni Join Forces to Provide End-to-End E-Procurement Solution with Enhanced Workflow Capability: Self-Service Functionality will Enable Thousands of Transactions to be Handled Daily from the Desktop," M2 Presswire, Coventry, Feb. 6, 2001, 1 page.

Melcher, "Local tech firm creates retail markdown tool", Mar. 24, 2000, Cincinnati Business Courier, 3 pages.

"Manugistics Announces Powerful Markdown Optimization Solution for Retailers", Business Wire, Jun. 10, 2003, 5 pages.

"ProfitLogic Launches ProfitLogic 2004: An Expanded Merchandise Optimization Suite Designed to Help Retailers Make More Profitable Merchandising Decisions", InternetRetailer.com, Jan. 12, 2004, 22 pages.

"SAS Acquires Marketmax", Outsourced-logistics.com, Oct. 13, 2003, 3 pages.

"There Goes the Rainbow Nut Crunch", BusinessWeek.com, Jul. 19, 2004, 3 pages.

Baxter, John, "Operational Research in Retailing", Operational Research Quarterly, Sep. 1951, vol. 2, No. 3, 5 pages.

Boyles, Carolee, "Uncover Slow-Selling Inventory-Outdoor Marketplace", Shooting Industry, Feb. 2003, 2 pages.

Kelkar et al., "Price Modeling in Standards for Electronic Product Catalogs Based on XML", 2002, pp. 366-375.

Lee, Calvin B., Ph.D., "Demand Chain Optimization: Pitfalls and Key Principles", NONSTOP's "Supply Chain Management Seminar" White Paper Series, 2002, 27 pages.

Notice of Allowance for U.S. Appl. No. 11/074,586, mail date Feb. 4, 2008, 4 pages.

Office Action for U.S. Appl. No. 10/900,970, mail date Oct. 1, 2009, 24 pages.

Office Action for U.S. Appl. No. 10/900,970, mail date Feb. 25, 2008, 19 pages.

Office Action for U.S. Appl. No. 10/900,970, mail date Apr. 20, 2009, 24 pages.

Office Action for U.S. Appl. No. 10/900,970, mail date Aug. 27, 2007, 13 pages.

Office Action for U.S. Appl. No. 10/900,970, mail date Sep. 17, 2008, 22 pages.

Office Action for U.S. Appl. No. 10/926,847, mail date Oct. 17, 2007, 11 pages.

Office Action for U.S. Appl. No. 10/926,847, mail date Oct. 28, 2008, 13 pages.

Office Action for U.S. Appl. No. 10/926,847, mail date Apr. 18, 2008, 14 pages.

Office Action for U.S. Appl. No. 10/926,847, mail date Jun. 9, 2009, 19 pages.

Office Action for U.S. Appl. No. 10/926,847, mail date Sep. 23, 2009, 18 pages.

Office Action for U.S. Appl. No. 10/927,646, mail date Oct. 5, 2009, 11 pages.

Office Action for U.S. Appl. No. 10/927,646, mail date Oct. 8, 2008, 13 pages.

Office Action for U.S. Appl. No. 10/927,646, mail date Apr. 15, 2009, 30 pages.

Office Action for U.S. Appl. No. 10/985,741, mail date Jan. 21, 2010, 28 pages.

Office Action for U.S. Appl. No. 10/985,741, mail date Jan. 6, 2009, 16 pages.
Office Action for U.S. Appl. No. 10/985,741, mail date Nov. 1, 2007, 9 pages.
Office Action for U.S. Appl. No. 10/985,741, mail date Jun. 25, 2008, 12 pages.
Office Action for U.S. Appl. No. 10/985,741, mail date Jun. 25, 2009, 23 pages.
Office Action for U.S. Appl. No. 11/074,586, mail date Nov. 2, 2007, 11 pages.
Office Action for U.S. Appl. No. 11/074,586, mail date May 15, 2007, 9 pp.
Office Action for U.S. Appl. No. 12/135,061, mail date Feb. 16, 2010, 5 pages.
Office Action for U.S. Application No. 12/135,061, mail date Aug. 6, 2009, 5 pages.
SAS (R) Markdown Optimization, 2004, Flyer.
Srinivasan et al., "Concepts and Strategy Guidelines for Designing Value Enhancing Sales Promotions", Journal of Product and Brand Management, vol. 7, No. 5, 1998, pp. 410-420.
Advisory Action for U.S. Appl. No. 10/900,970, mail date Jul. 8, 2009, 3 pages.
Advisory Action for U.S. Appl. No. 10/900,970, mail date Jun. 4, 2008, 5 pages.
Advisory Action for U.S. Appl. No. 10/926,847, mail date Sep. 3, 2009, 3 pages.
Advisory Action for U.S. Appl. No. 10/927,646, mail date Jun. 22, 2009, 3 pages.
Advisory Action for U.S. Appl. No. 10/985,741, mail date Apr. 7, 2010, 3 pages.
Advisory Action for U.S. Appl. No. 10/985,741, mail date Mar. 30, 2009, 4 pages.
Office Action for U.S. Appl. No. 10/926,847, mail date Apr. 13, 2010, 22 pages.
Office Action for U.S. Appl. No. 10/927,646, mail date Apr. 12, 2010, 12 pages.
Advisory Action for U.S. Appl. No. 10/927,537, mail date May 12, 2010, 3 pages.
Notice of Allowance for U.S. Appl. No. 10/900,970, mail date May 28, 2010, 18 pages.
Office Action for U.S. Appl. No. 10/927,537, mail date Mar. 3, 2010, 51 pages.
Office Action for U.S. Appl. No. 10/927,537, mail date May 6, 2008, 8 pages.
"Managing Markdown Madness", Mar. 1999, Chain Store Age: 75, 3, p. 118; 2 pages.
Advisory Action for U.S. Appl. No. 10/926,847, mail date Jun. 23, 2010, 3 pages.
Advisory Action for U.S. Appl. No. 10/927,537, mail date Mar. 31, 2009, 3 pages.
Advisory Action for U.S. Appl. No. 10/927,646, mail date Jun. 18, 2010, 3 pages.
Malone, Scott, "The 'New' Buyer: Creativity Takes Back Seat to Biz", Footwear News, Mar. 31, 1997, v53, n13, 3 pages.
Notice of Allowance for U.S. Appl. No. 10/926,847, mail date Mar. 30, 2011, 23 pages.
Notice of Allowance for U.S. Appl. No. 12/135,061, mail date May 28, 2010, 6 pages.
Office Action for U.S. Appl. No. 10/985,741, mail date Apr. 8, 2011, 19 pages.
Smith et al., "A Discrete Optimization Model for Seasonal Merchandise Planning", Journal of Retailing, Summer 1998, v74, n2, p. 193 (29), 16 pages.

* cited by examiner

METHOD AND SYSTEM FOR PRICE PLANNING

CROSS REFERENCE TO RELATED PATENT APPLICATIONS

This application claims the benefit of U.S. Provisional Patent Application No. 60/551,221, filed Mar. 8, 2004 and entitled "Inventory Management," and U.S. Provisional Patent Application No. 60/563,284, filed Apr. 16, 2004 and entitled "Inventory Management," both of which are hereby incorporated by reference.

FIELD OF THE INVENTION

The present invention relates generally to the field of methods and systems for generating price planning reports. More particularly, the present invention relates to methods and systems for generating a price planning reports based upon one or more price reduction.

BACKGROUND OF THE INVENTION

Various market requirements may necessitate price adjustments and/or price planning decisions. The price adjustments and/or price planning decisions often must be implemented in a relatively short period of time. However, the price adjustments are typically made in view of one or more predicted results for the adjustment or price plan. For example, the effect of the price adjustments on one or more budgets may be a factor in determining whether price adjustments are allowed for a particular article or set of articles and, if so, in setting the amount of the price adjustments.

Price adjustments and planning decisions may be made using manual selection systems or, alternatively, automated pricing processes such as a slow seller management process, a markdown controlling process, a promotion process, and the like. Manual pricing selection systems are invariably separate systems from automated pricing systems. Moreover, automated pricing systems are typically tailored to perform only one type of price planning (e.g., slow seller, promotion, etc.). As a result, users of such systems must often learn how to use two or three different price planning systems and associated user interfaces to perform price planning. This can result in increased training time for such users as well as increased chances for data entry errors and other mistakes.

Thus, there is a need for an automated system and method enabling users to plan and implement price adjustments in view of predicted or actual results based on the price adjustment. There is further a need for such a system and method configured to automatically update relevant data based upon adjustments in sale prices. In addition, there is a need for a system and method configured to display actual or predicts results based on the price adjustment at the time of the price adjustment.

SUMMARY OF THE INVENTION

One embodiment of the invention relates to a method of generating a price planning schedule. The method includes receiving price planning input from at least one of an automated pricing engine and a manual pricing engine. The method further includes generating a price planning schedule based on the price planning input and a price planning budget associated with the price planning input.

Another embodiment of the invention relates to a system for generating a price planning schedule. The system includes a user interface configured to display price planning input from at least one of an automated pricing engine and a manual pricing engine. The system further includes a price planning workbench configured to generate a price planning schedule based on the price planning input and a price planning budget associated with the price planning input.

Yet another embodiment of the invention relates to a program product for generating a price planning schedule, comprising machine-readable program code. The program code, when executed, causes one or more machines to perform the method steps. The method steps include receiving price planning input from at least one of an automated pricing engine and a manual pricing engine. The method steps further include generating a price planning schedule based on the price planning input and a price planning budget associated with the price planning input.

Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION OF EXEMPLARY EMBODIMENTS

In the following description, for the purposes of explanation, numerous specific details are set forth in order to provide a thorough understanding of the present invention. It will be evident to one skilled in the art, however, that the exemplary embodiments may be practiced without these specific details. In other instances, structures and devices are shown in diagram form in order to facilitate description of the exemplary embodiments.

In at least one exemplary embodiment illustrated below, a computer system is described which has a central processing unit (CPU) that executes sequences of instructions contained in a memory. More specifically, execution of the sequences of instructions causes the CPU to perform steps, which are described below. The instructions may be loaded into a random access memory (RAM) for execution by the CPU from a read-only memory (ROM), a mass storage device, or some other persistent storage. In other embodiments, multiple workstations, databases, process, or computers can be utilized. In yet other embodiments, hardwired circuitry may be used in place of, or in combination with, software instructions to implement the functions described. Thus, the embodiments described herein are not limited to any particular source for the instructions executed by the computer system.

Figure 1:
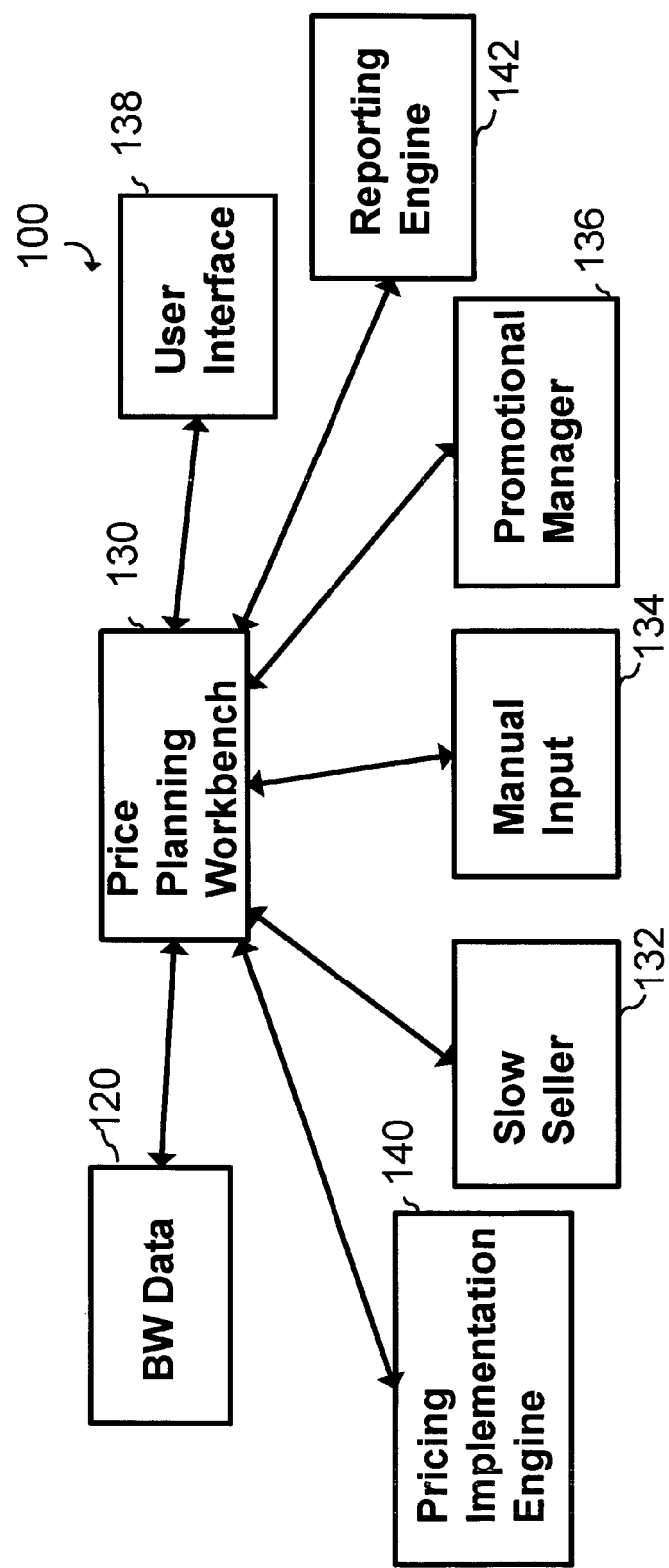
FIG. 1 is a general block diagram illustrating an exemplary embodiment of a system for processing data related to retail operations and planning.

Referring now to FIG. 1, a general block diagram illustrates an exemplary embodiment of a retail planning system 100 for processing data related to retail operations and planning. Retail planning system 100 includes a data warehouse 120 and a price planning workbench 130.

According to the exemplary embodiment, retail planning system 100 may include additional components configured to manage and implement price planning for retail store operations. For example, retail planning system 100 may further include additional components such as a procurement engine, a supply engine, a merchandise controlling engine, a valuation engine, etc. The components of retail planning system 100 may further be interconnected such that information may be freely exchanged between the components of retail planning system 100.

Retail planning system 100 may further be associated with one or more additional external components such as a plurality of cash register systems associated with retail store locations. The cash register systems may be configured to perform a number of functions associated with retail store operation such as pricing implementation, inventory control, data management, etc.

Retail planning system 100 may be implemented as a single system, a distributed system, or any combination thereof. Retail planning system 100 may be implemented using a single computing system, a plurality of computing systems, software, hardware, or any other system or combination of systems to perform the functions described herein. Further, the components associated with system 100 may also be implement using single or multiple systems.

Data warehouse 120 is a data repository configured to receive, sort, and process information related to retail operations and planning. Data warehouse 120 may also be implemented as using a single or multiple systems. Data warehouse 120 may further include one or more functions associated with it to permit a user to efficiently organize and retrieve stored data. It may also contain historical data on products and services such as past sales and prices. Data warehouse 120 is an end to end data warehouse that provides functionality for the sharing of data and analysis tools to utilize the stored data. Preferably, data warehouse 120 is a SAP Business Information Warehouse (SAP BW™) provided by SAP.

Price planning workbench 130 is preferably a data processing system or software configured to control, display, interface with operators, or perform other operations to generate a price planning schedule. Although workbench 130 is preferably implemented in an SAP based workbench, interface, and architecture, any other systems may be utilized.

Price planning workbench 130 is a data processing system configured to allow a user to perform pricing tasks (e.g., receive price planning input data, access applicable budgeting data, generate a price planning schedule, implement the price planning schedule, etc.) as will be further described below with reference to FIGS. 2-9. According to an exemplary embodiment, price planning workbench 130 includes a slow seller management engine 132, a manual pricing engine 134, a promotion management engine 136, a user interface 138, a pricing implementation engine 140, and a reporting engine 142.

A price planning schedule may be implemented by a data structure configured to contain information related to one or more price changes. The price changes may include a price change by specifying a new sales price, a percentage change based on the original or current sales price, or an absolute price change by specifying a difference from the original or current sales price. Further, the price planning schedule may include other information associated with the price change such as timing information (e.g., validity dates), quantity limits, automatic versus manual implementation, associated articles, etc. The price planning schedule may further include one or more results based on the price changes included in the price planning schedule. The included one or more results may be actual results based on the scheduled price changes and/or predicted results.

Price planning workbench 130 is generally configured to enable a user to take corresponding budget and/or other values affected by price changes into account in planning and activating price changes to create a price planning schedule based on pricing input information. Exemplary values that may be affected by price changes include sales and stock quantities, prices, price reductions (rebates and discounts), units, profit margins, etc.

During the creation of the price planning schedule, an initial budget planning value may be created representing an effect on the corresponding budget. The initial budget planning value may be generated within data warehouse 120 based on budget utilization from prior periods, as well as the budget for the current period. Subsequently, upon activation of the price changes during defined validity dates, the corresponding budget may be updated based upon actual sales occurring under the price planning schedule and/or forecasted sales. During the updating process, the initial budget planning value may be compared with a budget usage resulting from implementation of the price planning schedule and involved article quantities. Advantageously, implementing a price planning schedule in conjunction with a corresponding budget enables cost control for any price reductions.

According to another embodiment, a user interface may be used to display the results of the proposed price changes contained in the price schedule on a number of values. For example, the user interface may display the effect of a given set of price changes on a store's profitability. Alternatively, results may be configured to be included in the generated price planning schedule.

Generally, engines 132, 134, and 136 communicate with price planning workbench 130 either directly or as a downstream process. Direct communication may include an active exchange of data during processing. Downstream processing includes processing by the engines, followed by a data transfer to workbench 130 for processing by workbench 130. Workbench 130 is configured to interface with each engine using custom information for that engine. For example, engines 132, 134, and 136 may be configured to generate information documents that are customized to each particular engine and transferred to workbench 130. According to an alternative embodiment, engines 132, 134 and 136 may be implemented as components within price planning workbench 130.

Slow seller management engine 132 may be a system configured to communicate with one or more of a budgeting system, a planning system, an inventory system, or any other systems within or in communication with system 100. According to an exemplary embodiment, slow seller management system 132 is configured to identify and recommend pricing or other strategies for products or inventory that is selling at a slower rate than forecast. Pricing strategies may include recommended markdowns to increase sales rate. Slow seller management engine 132 is discussed in further detail below with reference to FIG. 2.

Manual pricing engine 134 may be any system or method for generating price planning input based on manual input received from a user. According to an exemplary embodiment, a user may utilize a user interface associated with manual pricing engine 134 or user interface 138 for price planning workbench 130 to enter one or more price changes such as a new sales price, a percentage change based on the original or current sales price, or an absolute price change by specifying a difference from the original or current sales price. The user may further enter any associated information such as timing information, quantity information, store location information, etc. Manual pricing engine 134 is discussed in further detail below with reference to FIG. 3.

Promotion management engine 136 may be any system or method for generating price planning input based upon one or more promotions. A promotion may be a promotion associated with a particular store, a chain of stores, a particular article, a line of articles, a geographic location or region, etc. A promotion may include a price change, timing information, article information, store location, or any other information related to the promotion to be implemented. Promotion management engine 136 is discussed in further detail with reference to FIG. 4.

User interface 138 may be any type of interface configured to allow a user to interact with price planning workbench 130 and/or any associated components such as slow seller management engine 132, manual pricing engine 134, and promotion management engine 136. Interface 138 may be configured such that each user is assigned to one or more specific budgets, which in turn are assigned to specific articles. Advantageously, user assignments may be used to define the set of articles that a user is authorized to process. Interface 138 may further be configured to display the status of a price planning schedule during any stage of preparation and/or implementation. Interface 138 is discussed in further detail below with reference to FIG. 7.

Pricing implementation engine 140 may be any type of system or method configured to receive a price planning schedule and communicate with one or more components associated with retail planning system 100 to implement price changes defined in the price planning schedule. Pricing implementation engine 140 may be further configured to implement functions associated with the price changes such as budgets updates, inventory tracking, etc. Pricing implementation engine 140 is discussed in further detail below with reference to FIGS. 8 and 9.

Reporting engine 142 may be any type of system or method configured to operate in conjunction with price planning workbench 130 and user interface 138 to generate and display or otherwise provide one or more results based on proposed price changes. The one or more results may be predicted and/or actual results. For example, a predicted result may be a predicted increase in sales based on the reduction in price. Such predicted results may be generated by price planning workbench 130 based upon historical values, intelligence systems, simple formulas, and/or any other predictive formula or calculation. Actual results may include results known to occur based on the proposed price changes. For example, an actual result may include maximum sales revenue that can be generated based on stock levels and the revised prices.

According to alternative embodiments, price planning workbench 130 may include more, fewer, or different systems than described above to facilitate creation, processing, and maintenance of a price planning schedule. In addition, functions associated with one or more systems described above may alternatively be associated with one or more alternative systems. For example, manual pricing engine 134 may be implemented as a component within promotion management engine 136.

Figure 2:
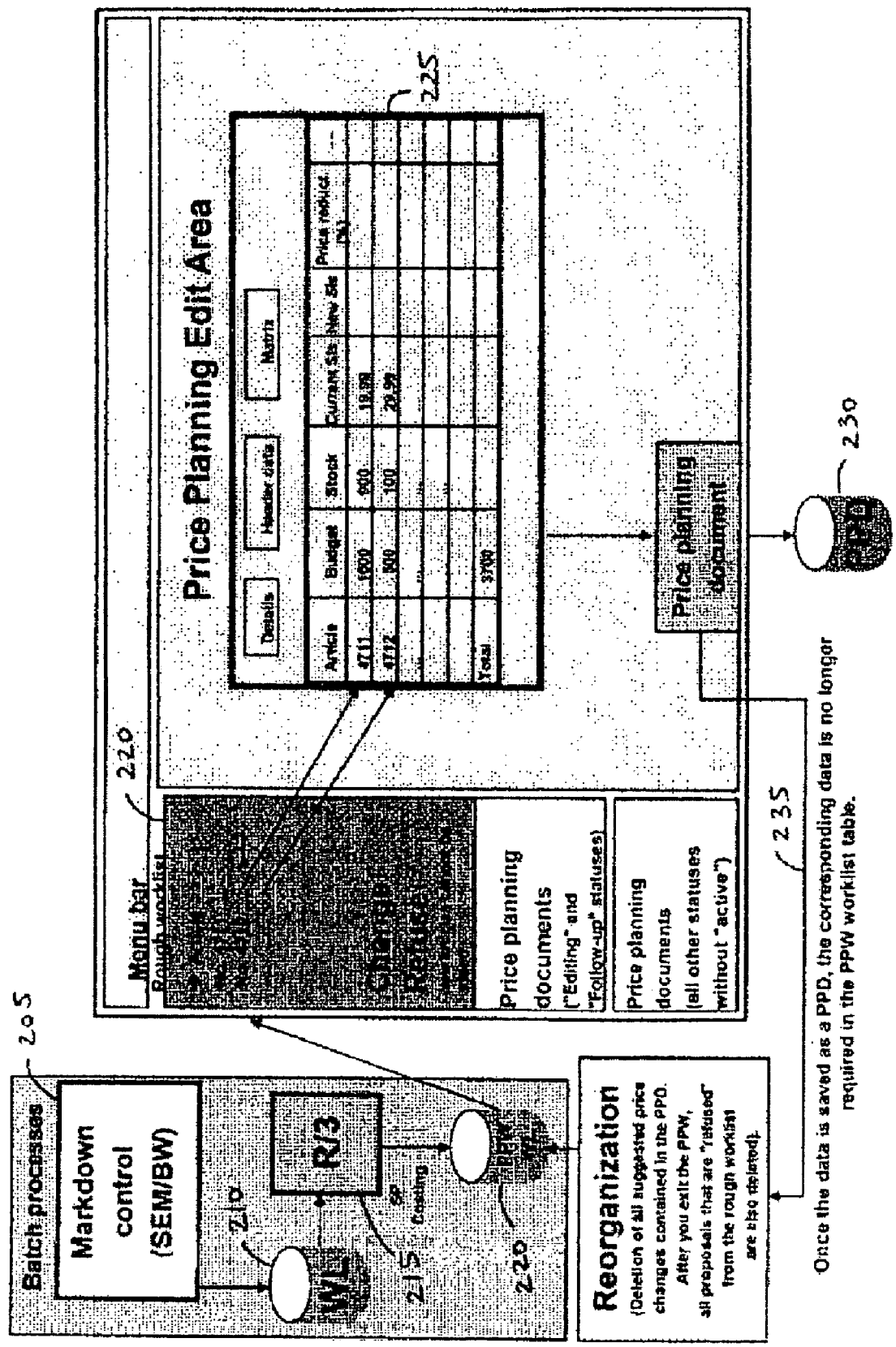
FIG. 2 is a process flow block diagram illustrating an exemplary embodiment of a method for transferring markdown controlling and markdown planning information from a slow seller management engine to a price planning workbench.

Referring now to FIG. 2, a process flow block diagram illustrates an exemplary embodiment of a method for transferring markdown controlling and markdown planning information from slow seller management engine 132 to price planning workbench 130. Generally, the data is transferred directly to workbench 130 through a background processing-capable interface and saved within workbench 130 as described below.

In a step 205, slow seller management engine 132 is configured to apply one or more sets of rules to generate one or more price change proposals from one or more markdown profiles. The markdown profiles used to generate the price change proposals may include sets of price changes that are applied to single articles or groups of articles based on levels of inventory that remain unsold after a specific time period.

According to an exemplary embodiment, the price changes proposals created from the markdown profiles may be saved in a worklist 210 using batch processing on a data warehouse system. Worklist 210 at this point may include information related to the price change proposal such as a price activation level, an actual lifecycle, a total lifecycle, an analysis date, a sales quota, a target sales quota, a proposed markdown percentage, a current stock level, a unit of measure, articles affected by the price changes, etc. Worklist 210 may include information related to single articles or group of articles. The worklist is associated with an infocube. In a data warehouse system, the infocube is a storage container where data regarding an article or group of articles is stored. This data comes from, for example, points-of-sale (e.g., retail outlets) and relates to actual sales of the relevant articles. The Price Planning Workbench contains association of worklists with infocube so that the system knows what infocube to access in order to store or retrieve data. Analysis programs and corresponding report generators access the infocubes to retrieve historical sales data, for example, in order to make determinations regarding current pricing and price reductions for the relevant articles.

After worklist 210 is created on the backend data warehouse system, it may be transferred in a step 215 to a rough worklist 220 in price planning workbench 130, which may be running on a front end system. According to an exemplary embodiment, the transfer from the back end data warehouse system to price planning workbench 130 on the front end system may be accomplished using a background processing-capable interface. As persons skilled in the art will appreciate, transferring step 215 may include multiple substeps such as formatting the worklist in an outbound message, transferring the message via XI asynchronous transfer, reformatting the worklist received in an inbound message, etc.

According to an exemplary embodiment, transferring step 215 includes a data enrichment substep. For example, rough worklist 220 may be populated with exchange budget data such as sales prices, budget data, stocks, etc. Rough worklist 220 may be populated with such enriched data when rough worklist 220 is initially created and/or at periodic updates and/or in real-time. The data source may be associated with data warehouse 120, workbench 130, and/or any other source, both internal and external.

According to an exemplary embodiment, user interface 138 of price planning workbench 130 may be configured to allow a user to intervene in the data enrichment process. Intervention may include the data enrichment step described above, setting timing information to control when the enrichment step occurs, defining the scope of the information to be used in the data enrichment step, etc. Advantageously, allowing the user to intervene provides the user with greater control to provide relevant and contemporaneous data in the creation of a price planning schedule.

According to an exemplary embodiment, transferring step 215 may also include a substep that checks for conflicts within rough worklist 220. For example, rough worklist 220 may include price changes for a particular color, while the pricing reference material is for a generic article. Any inconsistent data found during this process may be reported to the user through user interface 138. Prior to processing worklist 220 containing the erroneous data records, user interface 138 may be configured to allow the user to correct the errors if necessary. The errors may be recorded in an error log for later analysis to reduce future occurrences.

From rough worklist 220, a user may transfer the price change proposals to an editing area 225 of user interface 138 as will be discussed in further detail below with reference to FIG. 7. Editing may include any process involving a change in one or more prices or price change proposals for items included in a worklist. Editing may further include approval or rejection of any prices and/or price change proposals. Editing area 225 may further be configured to display additional data associated with the items, prices, price change proposals, etc. that may be useful during editing. Editing may further include constrained editing in which the changes that can be made by a user are constrained by one or more external constraints, such as the budget, inventory levels, policy, etc.

Transfer of the price change proposals to editing area 225 of user interface 138 may further including a substep of generating one or more results based on the price change proposals. Generating the one or more results may include generating actual and predictive results based on the price changes. Reporting engine 142 may be configured to generate the one or more results.

An actual result may be a result that will occur based upon implementation of the proposed price changed. Exemplary actual results may include calculation of the resultant price based on the proposed price change, a pricing schedule based on a number of price changes over a time interval, a change in the maximum amount of revenue that can be realized based on actual stock levels and the proposed price (i.e., loss of profit), etc.

A predictive results may be a result that is generated based upon one or more rules or formula configured to predict at least one output based on a number of inputs. The rules or formulas may be configured based upon expert knowledge, known correlations, historical analysis, etc. For example, a predictive result may include an increased number of units and/or dollar amount of articles expected to be sold during a particular time period as a result of the price change.

Following generation of the actual and/or predictive results, the results may be displayed to the user in the editing area 225 such that the user may receive contemporaneous feedback regarding the consequences of the proposed price changes. The results may further be included within a generated price planning schedule, further discussed below, for communication to and utilization within related systems. For example, the price planning schedule may include a price planning schedule configured to provide instructions to cash register systems regarding upcoming price changes.

Following editing of the price planning workbench worklist, the worklist may be saved as a price planning schedule within a price planning document (PPD) 230. Price planning document 230 may be any type of document that includes a price planning schedule and/or other information needed to implement the price changes suggested in the price planning workbench worklist. Exemplary information may include article data, stock quantities, associated price markdowns, price activation levels, budget data, etc.

Following creation of price planning document 230, the corresponding data may be deleted from rough worklist 220 in a step 235. The deletion of such data reduces the amount of extraneous data stored within price planning workbench 130 and thus improves efficiency and reduces required storage.

Figure 3:
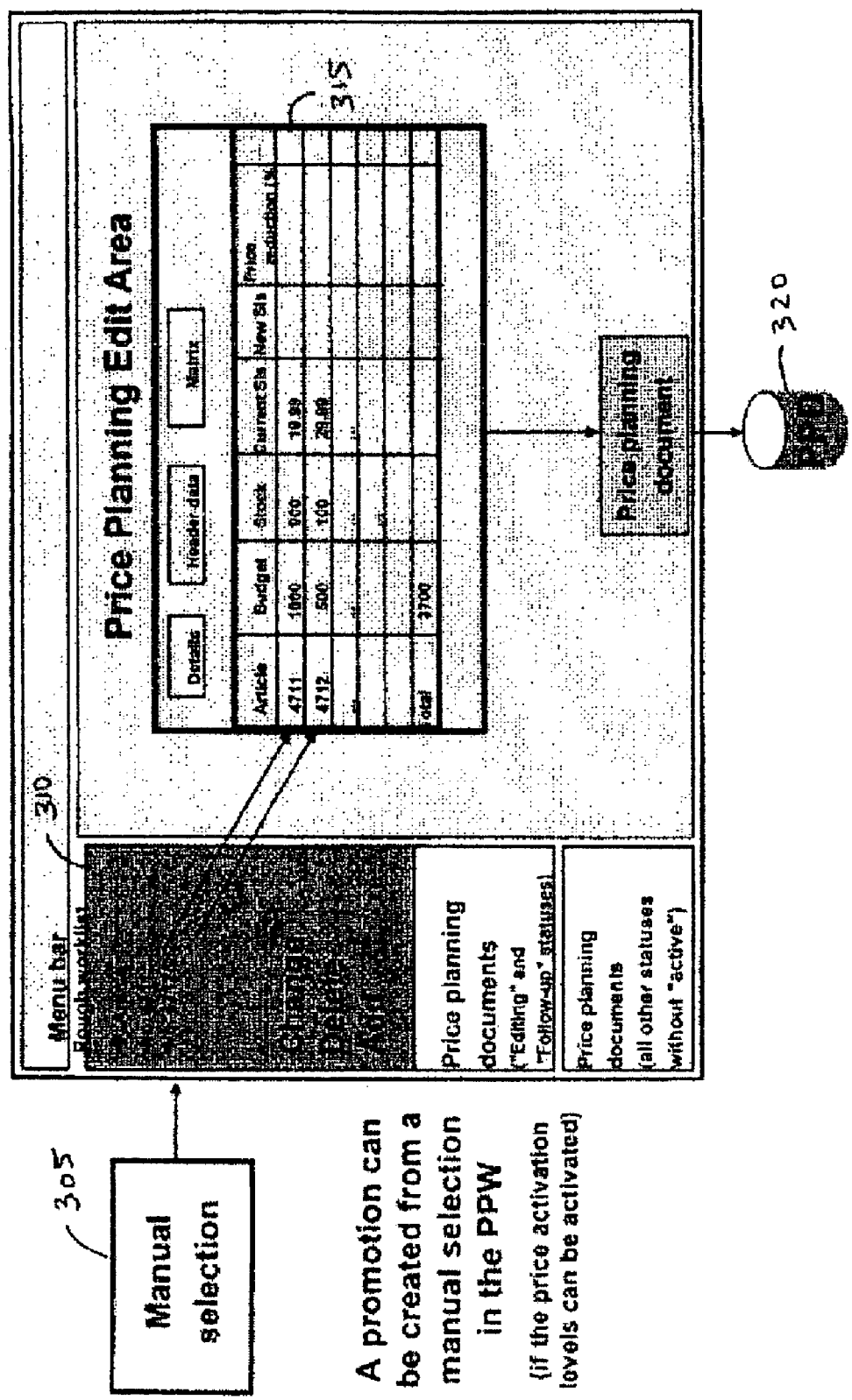
FIG. 3 is a process flow block diagram illustrating an exemplary embodiment of a method for generating a worklist including manual price changes within a manual pricing engine and transferring the worklist to a price planning workbench to generate a price planning document.

Referring now to FIG. 3, a process flow block diagram illustrates an exemplary embodiment of a method for generating a worklist including manual price changes within manual pricing engine 134 and transferring the worklist to price planning workbench 130 to generate a price planning document. The manual price changes may include definitions of price activation levels (organization levels) where the new sales prices to be defined can also be identified.

In a step 305, a user may utilize user interface 138 to select one or more articles for which a manual price change is desirable. According to an exemplary embodiment, user interface 138 may be utilized to display an article hierarchy for which a particular user is authorized to implement manual price changes. The user may navigate through such an article hierarchy to select a particular article or group of articles for which price changes are to be implemented. Selected articles are initially displayed hierarchically in a rough worklist 310 in user interface 138.

Following selection of the articles in step 305 and creation of rough worklist 310, the articles in rough worklist 310 may be selectively transferred to an editing area 315 within user interface 138. When articles are transferred from rough worklist 310 to editing area 315, the articles are removed from rough worklist 310. Further, as described above with reference to FIG. 2, the transferred data may be enriched or supplemented with data stored in data warehouse 120 or data available through price planning workbench 130.

Editing area 315 may be utilized to make changes to article prices and other attributes of the selected articles. As mentioned above, price changes may include a new specific price, a percentage markdown from an existing price, a reduction by a specific amount, etc. Further, price changes may include effective dates or other timing information. For example, a price change may include a series of price changes wherein each price change is set to occur on a specific date. Alternatively, a price change may include more specific information, such as setting a percentage price change based on the quantity of articles still in stock at a particular date. Editing area 315 may further include a result reporting function as described above with reference to FIG. 2.

After the selected articles have been edited in editing area 315, the articles may be saved as a price planning schedule within a price planning document (PPD) 320. Price planning document 320 may be any type of document that includes a price planning schedule and/or other information needed to implement the price changes suggested in the price planning workbench worklist. Exemplary information may include article data, stock quantities, associated price markdowns, price activation levels, budget data, etc.

Figure 4:
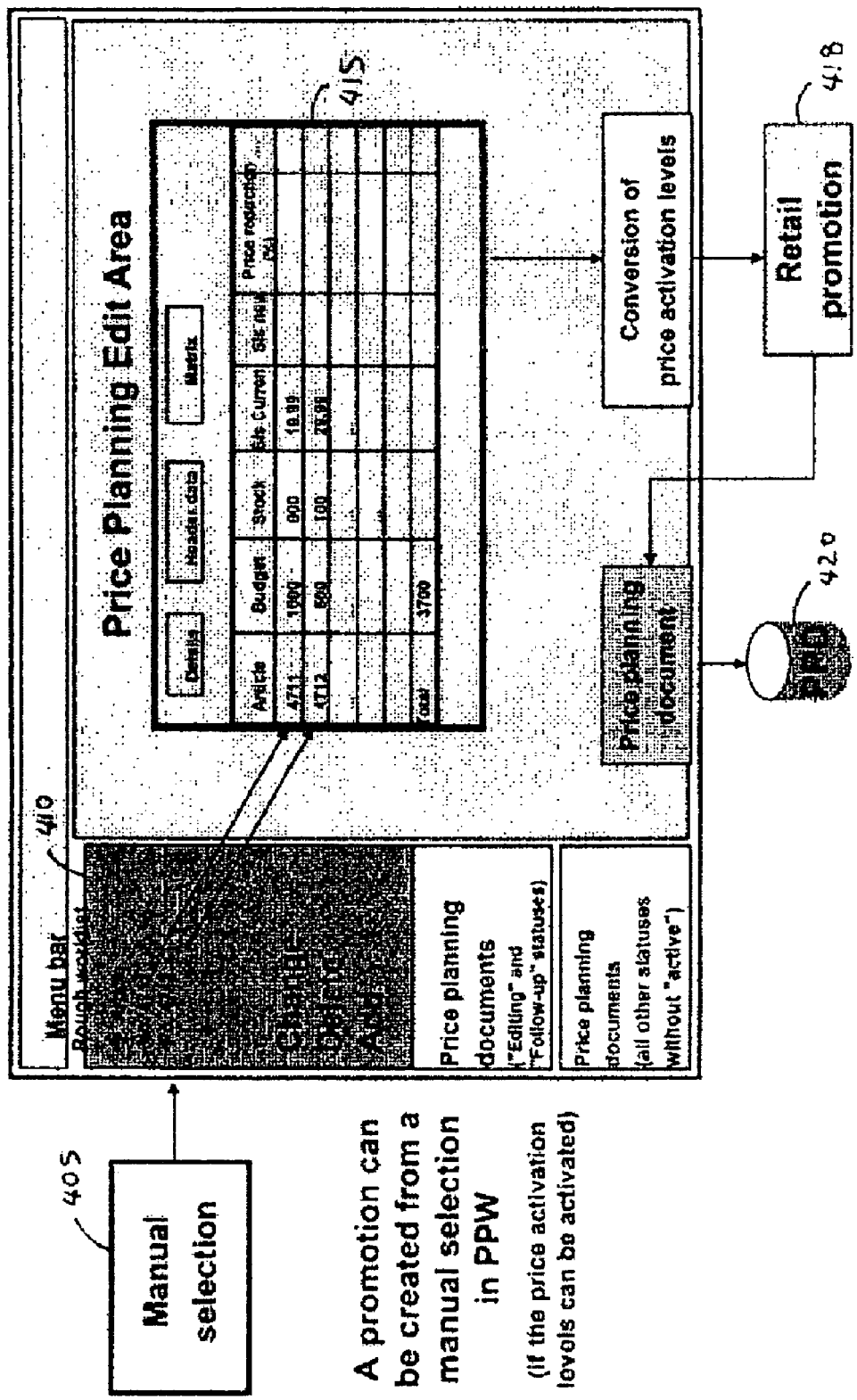
FIG. 4 is a process flow block diagram illustrating an exemplary embodiment of a method for generating a worklist including promotional related information within a promotion management engine and transferring the worklist to a price planning workbench.

Referring now to FIG. 4, a process flow block diagram illustrates an exemplary embodiment of a method for generating a worklist including promotional related information within promotion management engine 136 and transferring the worklist to price planning workbench 130. A promotion refers to a special event, retail sale, or other activity designed to reduce inventory. For example, spring sales events, two-for-one promotions, end-of-season sales, clearance sales, etc. are examples of sales promotions which may be used to reduce inventory. Sales promotions are different than a markdown controlling process which is not necessarily tied to an event or special circumstance.

Merchants often use markdowns to ensure that merchandise is nearly or completely sold out by the end of a season. Markdowns are price reductions such as retail sales promotions aimed at promoting the sale of certain articles to reduce inventory. Retail sales promotions reduce the gross margin, which means the revenue merchants earn for selling the merchandise is less than originally planned. Merchants usually plan a certain budget for retail sales promotions that must not be exceeded. Accordingly, retail sales promotions are applied restrictively in retail, which further increases the risk of remaining stocks at the end of the season. The primary goal in managing seasonal merchandise is to limit retail sales promotions to a minimum and apply them at the best suitable time and with maximum flexibility while ensuring that nearly all the merchandise is sold by the end of the season.

In order to achieve a high degree of integration between price planning workbench 130 and promotion management engine 136, engine 136 may be configured to be actuated from user interface 138 of price planning workbench 130. For example, user interface 138 may include a "create promotion" button or icon to allow a user to convert article pricing data that has been manually created using a process such as described above in connection with FIG. 3. For example, articles may be manually selected from an article hierarchy in a step 405, which results in a rough worklist 410. From rough worklist 410, selected articles may be transferred to an editing area 415. Then, when the "create promotions" function is activated, the manually entered price planning information (e.g., price activation levels) for the articles in editing 415 is converted into a retail promotion 418. Conversion of the manually entered price planning information into retail promotion 418 may also include adoption of data structures from manual pricing. When promotion 418 is created, user interface 138 may be utilized to enter additional promotion-relevant data (e.g., header data of the promotion). After retail promotion 418 is approved, it may be saved to a price planning document 420.

Figure 5:
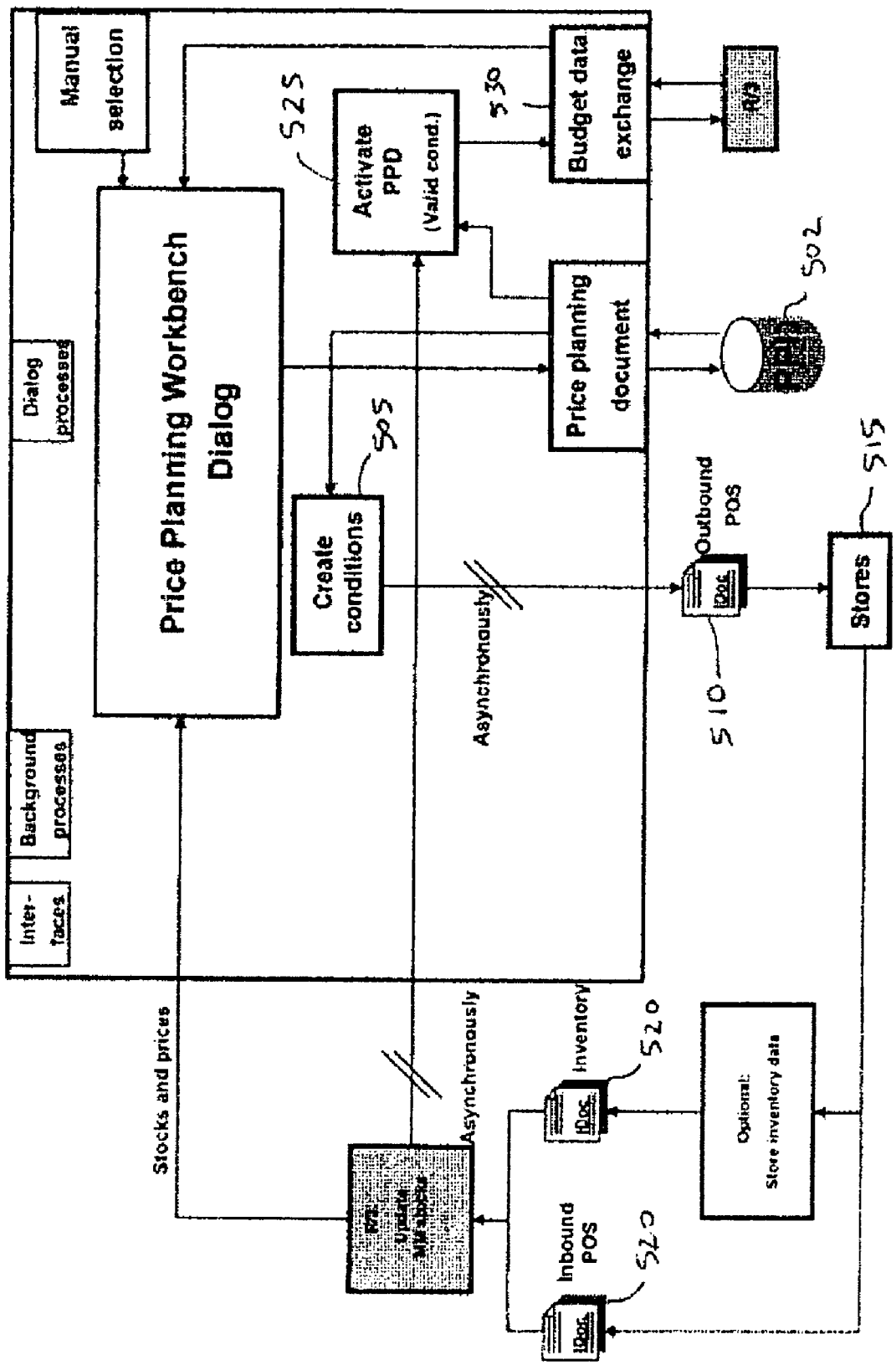
FIG. 5 is a detailed process flow block diagram illustrating an exemplary embodiment of a method for processing a price planning document to implement one or more price changes contained in the price planning document.

Referring now to FIG. 5, a more detailed block diagram illustrates an exemplary embodiment of a method for processing a planning document 502 to implement one or more price changes in retail planning system 100. Price planning workbench 130 may be configured to implement price planning document 502 through communication with one or more additional systems. The additional systems may include cash register systems, inventory systems, budgeting systems, etc.

According to an exemplary embodiment, price planning workbench 130 may be configured to create corresponding conditions 505 from price planning document 502. Corresponding conditions may be numerical data defining various levels in a hierarchy that is used to store retail prices. The numerical data may be utilized to set price activation levels, track relative sales, etc. In addition, price planning workbench 130 may be configured to generate one or more importation documents (or IDocs) 510. Outbound IDocs 510 may be contain price change information for use in cash register systems at retail locations 515. Transfer of IDocs 510 to the cash register systems at retail locations 515 may be implemented through converter software to convert the data into the appropriate format for the cash register system. Thus, IDocs 510 may be used to provide automatic, asynchronous generation of price change information for supply to the cash register systems.

The cash register systems may be configured to automatically implement the price changes described in price planning document 502 as contained within IDocs 510. The cash register systems may be further configured to automatically transfer sales data and/or retail store physical inventory data to retail planning system 100 by creating inbound IDocs 520. Advantageously, the sales data and/or store physical inventory in IDocs 520 may be utilized to provide or supplement the enhanced data provided to price planning workbench 130 as described above with reference to FIGS. 2-4.

In an exemplary embodiment, retail planning system 100 may be configured to provide automatic, asynchronous updates 525 of price planning document 502 that will become valid using the planned quantities from the promotion or current stock data. For example, when a price change is made within workbench 130, an asynchronous update may be utilized to transmit an iDoc 520 to one or more cash register systems. The iDoc may include a designation of when the prices changes should be activated based on inventory levels, timing, etc. Retail planning system 100 may further be configured to update a budget associated with price planning document 502 in a step 530.

Figure 6:
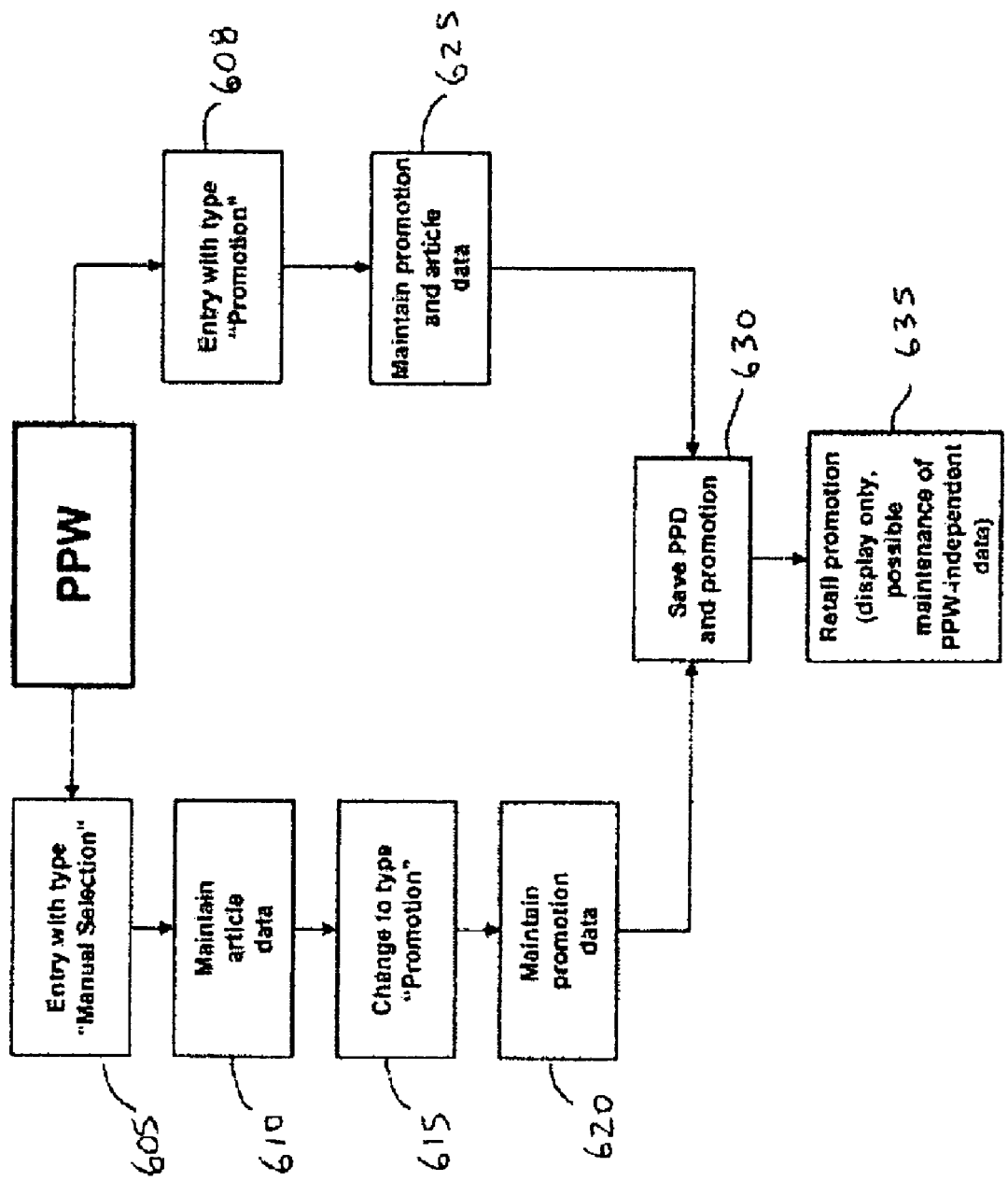
FIG. 6 is a flowchart illustrating an exemplary embodiment of a method for creating a promotion within price planning workbench.

Referring now to FIG. 6, a process flow diagram illustrates the two above-mentioned exemplary embodiments of a method for creating a promotion within price planning workbench 130. According to one such embodiment, a user utilizes interface 138 to indicate that a manual price change selection will be used to create a promotion as indicated by a step 605. According to the other embodiment, the user indicates that a promotion will be entered directly by a step 608.

Where a manual input selection is made in step 605, article data may be loaded into the edit area of user interface 138 to enable a user to manually edit pricing and/or article data in a step 610. Manually editing pricing and/or article data may include manually entering price changes, timing information, article selections, etc.

Following manual editing in step 610, a user may utilize interface 138 to create a promotion based upon the manually edited data in a conversion step 615. Upon creation of the promotion, the user may utilize interface 138 to modify information related to the promotion to be created in a step 620. Modifying information related to promotion may include changing one or more articles included in the promotion, timing information, sources included in the promotion, etc.

Where a selection is made to directly enter a promotion in step 608, a promotion may be created in a step 625. Creation of the promotion in step 625 may include loading of article and/or promotion data to the edit area of user interface 138 for manipulation by the user. For example, the user may use the edit area to make changes related to the articles and/or changes related to data for the promotion.

Following creation of a promotion and related article data in steps 620 or 625, price planning workbench 130 may be configured to create a price planning document and a promotion in a step 630. The price planning document may be distributed and maintained in a step 635 as described above with reference to FIG. 5.

Price planning workbench 130 may further be utilized to modify and/or control an existing promotion. Modifying and/or controlling an existing promotion may include various activities such as deactivating individual sale prices of an ongoing promotion, reactivating individual sale prices of an ongoing promotion, deactivating a complete promotion, reactivating a complete promotion, adding articles to a promotion, ending a promotion prematurely, extending the validity of an ongoing promotion, changing the sale prices of an ongoing promotion, and so on.

Figure 7:
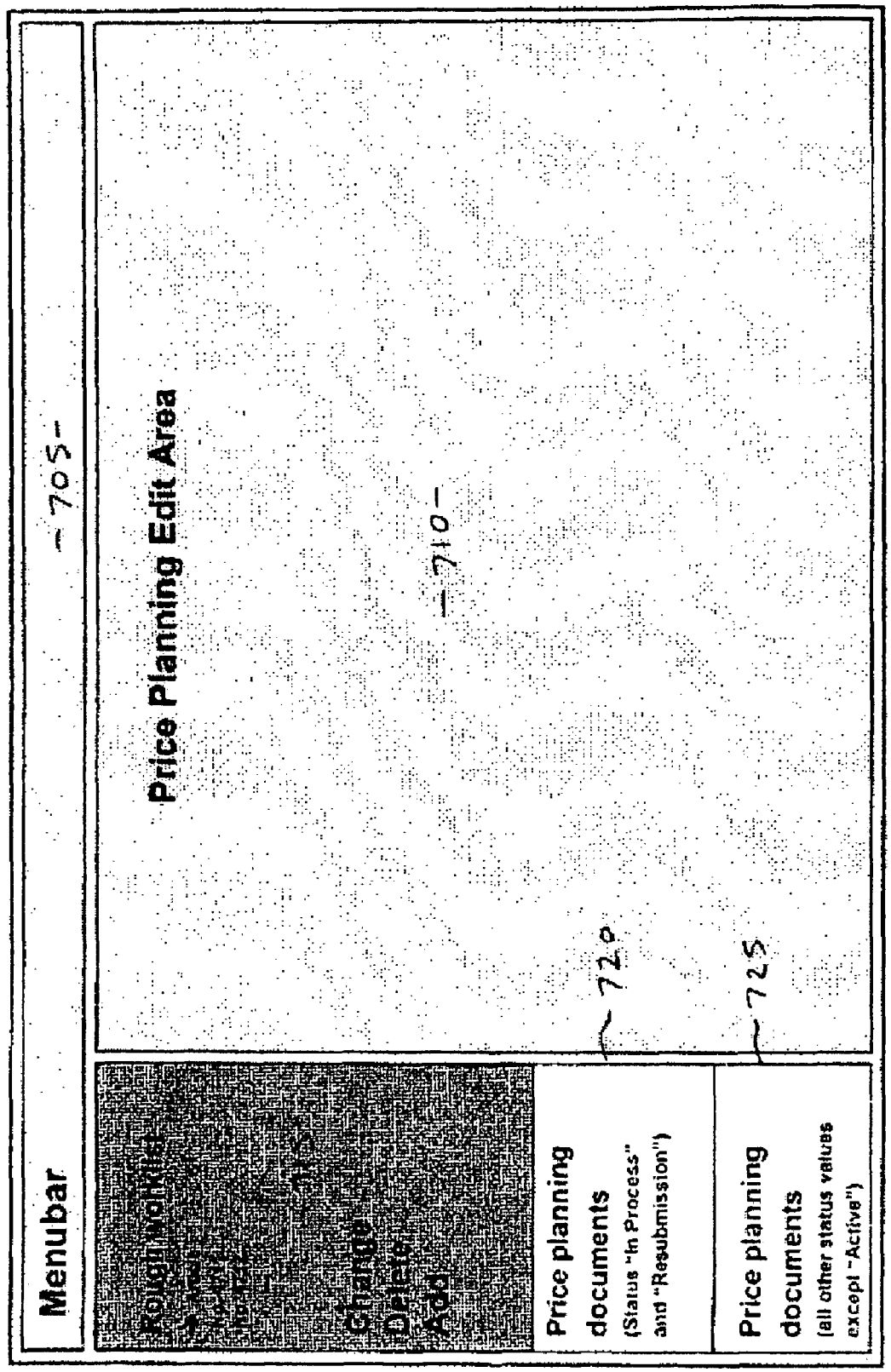
FIG. 7 is a block diagram illustrating an exemplary embodiment of a user interface for the price planning workbench.

Referring now to FIG. 7, a block diagram illustrates an exemplary embodiment of a user interface 138 for price planning workbench 130. User interface 138 may include a menu bar 705, a price planning editing area 710, a rough worklist area 715, and an active listing area 720 for price planning documents with a status such as "in process" or "resubmission." Further, user interface 138 may also include an inactive listing area 725 for price planning documents with a status such as "for release", "released", "conditions created", "partially active", and "cancelled".

Menu bar 705 may contain a plurality of icons that allow a user to navigation and perform functions within price planning workbench 130 and other systems associated with price on workbench 130. According to an exemplary embodiment, menu bar 705 contains icons configured to allow a user to perform a plurality of navigation, data processing, access, etc. functions.

Price planning editing area 710 may provide an overview screen of all previously selected articles for which the user may desire to implement price changes. According to an exemplary embodiment, each article may be displayed and aggregated into organizational levels based on a sorting criteria such as article type, article price, article location, timing information, etc., within editing area 710. Any additional or enhanced data associated with the article may also be displayed. The additional data may be obtained from data warehouse 120 or another source. Also, editing area 710 may be include a result reporting function as described above with reference to FIG. 2.

Price planning editing area 710 may also be configured to allow a user to open a detail view for an article. The detail view may allow a user to modify the organizational level within a hierarchical display, or make other changes to characteristics associated with the article. According to an exemplary embodiment, the detailed view may allow three possible price activation levels (e.g., distribution chain, price list, and store) to be displayed simultaneously or consecutively with their corresponding prices and/or markdown proposals.

Price planning worklist area 715 may be configured to display the rough worklist of selected articles for which price changes may be made. The rough worklist may be displayed in a hierarchical structure according to an article hierarchy or a merchandise group hierarchy. According to an exemplary embodiment, the user may select articles from within rough worklist area 715 to transfer the articles to price planning editing area 710. The transfer of articles from area 715 to area 710 may be implemented by selecting the articles, dragging and dropping the articles, double-clicking on the articles, etc.

Active listing area 720 may display a listing of all active price planning documents which a user may edit. When a price planning document is selected from active listing area 720, price planning workbench 130 may be configured to display the worklist associated with that price planning document in price planning worklist area 715. At the same time, price planning workbench 130 may also display articles associated with the price planning document in price planning editing area 710.

Inactive listing area 725 may display a listing of all inactive price planning documents which a user may not edit. Price planning workbench 130 may be configured such that the user can access but not modify the information in the price planning documents within inactive listing 725. Accordingly, a user may review these existing price planning documents for informational purposes.

Figure 8:
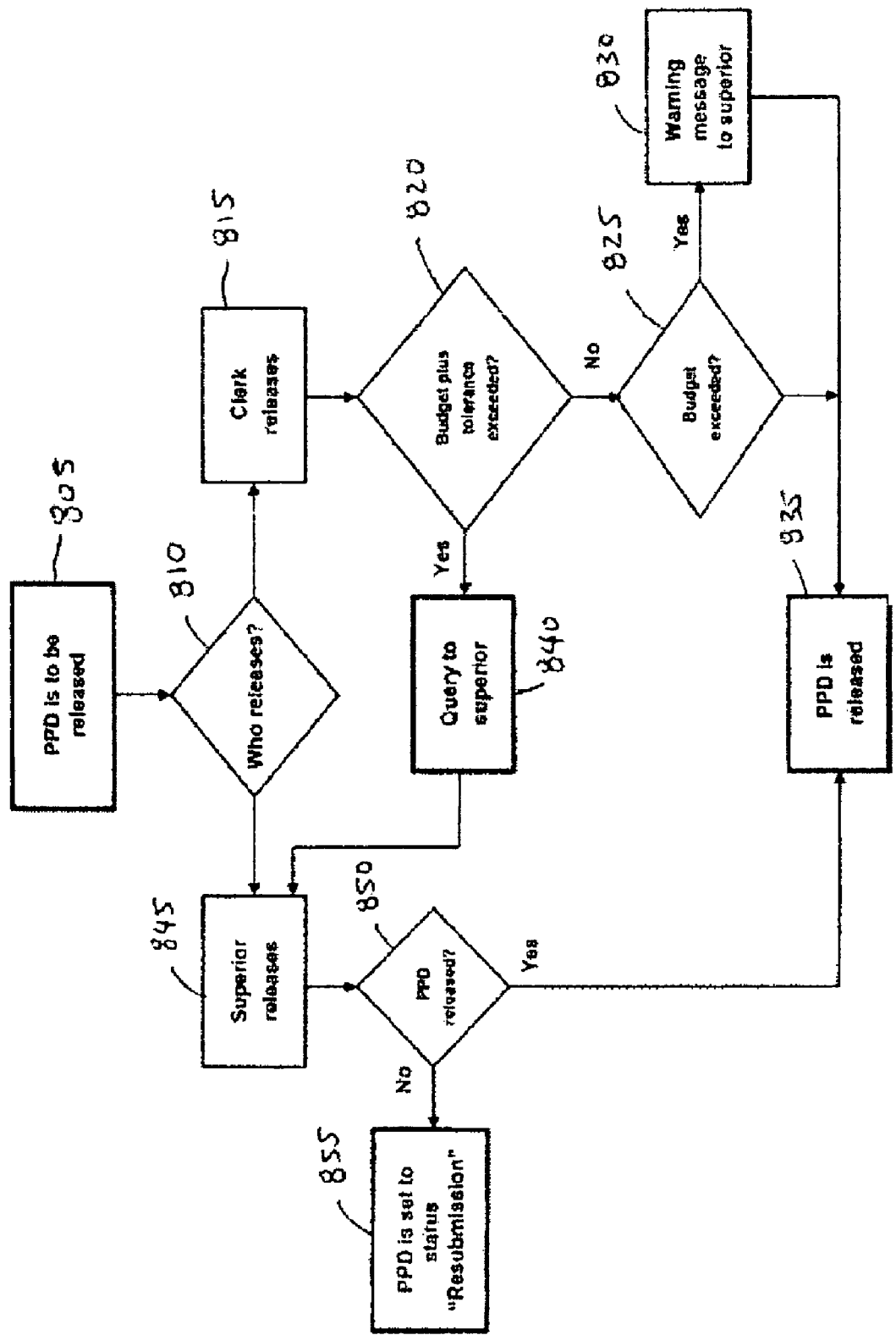
FIG. 8 is a flowchart illustrating an exemplary embodiment of a method for implementing a price planning schedule contained within a price planning document.

Referring now to FIG. 8, a process flow diagram illustrates an exemplary embodiment of a method for implementing a price planning schedule contained within a price planning document. According to an exemplary embodiment, a price planning document may require approval and authorization before a price planning schedule contained in the price planning document may be implemented. As explained below, pricing implementation engine 140 may be configured to implement an automated approval and authorization process for this purpose. Advantageously, the automated process may prevent the activation of unauthorized price plans while ensuring that authorized changes can be implemented as quickly as possible to, for example, react to worse-than-expected sales.

In a step 805, a price planning document to be released is received by pricing implementation engine 140. Upon receipt, pricing implementation engine 140 may make a determination in a step 810 whether the price planning document should be released by a clerk or a superior. In the former case, when a clerk releases the price planning document in a step 815, a determination is made in a step 820 whether a budget plus a tolerance value has been exceeded based upon the release of the price planning document. If the budget plus a tolerance value has not been exceeded, a determination is made whether the budget has been exceeded in a step 825. If the budget has been exceeded, a warning message is sent to the superior in a step 830. If the budget has not been exceeded, or following transmittal of the warning message to the superior in step 830, the price planning document is released in a step 835.

Where the budget plus tolerance has been exceeded in step 820, a query may be transmitted to the superior in a step 840. Where it is determined in step 810 that a superior should release the price planning document, or where the query has been sent to the supervisor from step 840, the superior releases the document in a step 845. In a step 850, a determination is made whether the price planning document should be released by pricing implementation engine 140. If engine 140 determines that the price planning document should not be released, the price planning document is set to status "resubmission" in a step 855. If engine 140 determines that the price planning document should be released, the price document is released in step 835.

Figure 9:
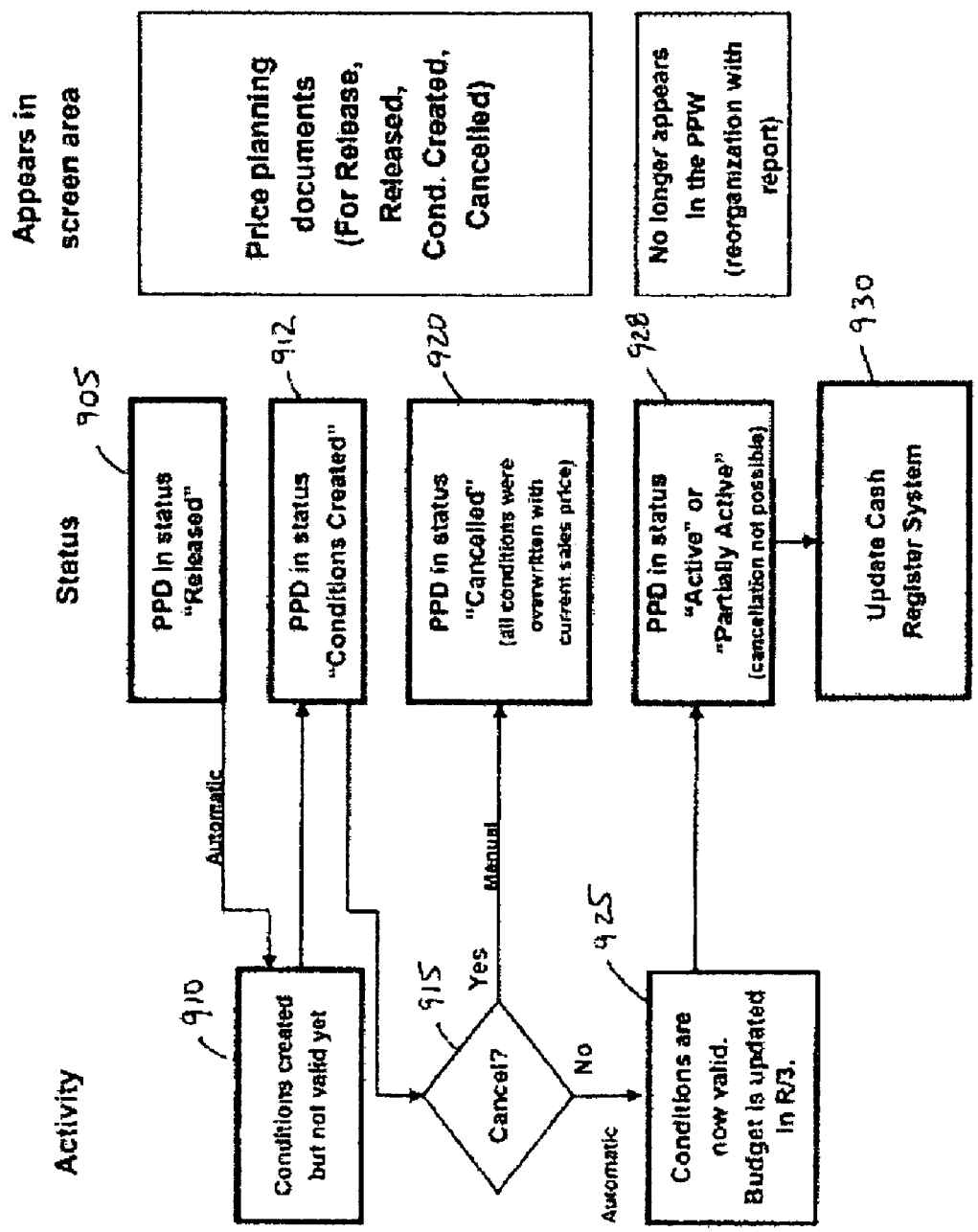
FIG. 9 is a flowchart illustrating an exemplary embodiment of a method for managing the status of a price planning schedule within a price planning document following release of the price planning document.

Referring now to FIG. 9, a process flow diagram illustrates an exemplary embodiment of a method for managing the status of a price planning schedule within a price planning document following release of the price planning document. In a step 905, a price planning document that has been approved for release is set to status "released". Following release of the price planning document, a determination is made whether conditions have been created but are not yet valid in a step 910 and the price planning document is set to status "conditions created" in a step 912. For example, a determination may be made that a condition specifies a inventory level at which a new set of prices should be activate, but that the specified inventory level has not been reached.

As long as the conditions are not yet valid, price planning workbench 130 may be configured to allow a user to cancel the price planning document at any time in a step 915. If a user manually cancels the price planning document, the price planning document is set to status "cancelled" in a step 920.

If the user does not cancel the price planning document, a determination is made in a step 925 whether the conditions are now valid. If the conditions are valid, the budget is updated in step 925 within retail planning system 100, and the price planning document is set to status "active" or "partially active" in a step 928.

According to an exemplary embodiment, price planning workbench 130 may be configured to transmit activated sales prices to cash register systems affected by the price changes in a step 930. Transmittal of the activated sales prices may occur manually or automatically based on periodic updates, validation of the conditions, etc.

Although the terms "article," "product," "retail product," and "inventory" are used herein to refer to the merchandise being sold, the present description will be applicable to the sale of any type of good or service. In either case, the pricing for merchandise being sold and/or services may be controlled or affected by the price planning workbench as described above.

As noted above, embodiments within the scope of the present description include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A method for use in a machine-readable medium for generating a price planning schedule, the machine-readable medium comprising program code stored therein executable by one or more processors, comprising:

receiving by the one or more processors a price planning input from at least one of an automated pricing engine and a manual pricing engine;

generating by the one or more processors a first price planning schedule based on the price planning input and a price planning budget associated with the price planning input;

determining by the one or more processors whether the price planning budget is within a predetermined tolerance after adjusting the price planning budget based on the first price planning schedule;

transmitting by the one or more processors the first price planning schedule to at least one cash register based on the price planning budget being within the predetermined tolerance;

transmitting by the one or more processors updated sales data and updated inventory data from the at least one cash register to a price planning workbench; and wherein the price planning workbench is configured to modify a promotion by adding an article to the promotion and changing a sales price of the promotion, the price planning workbench further configured to modify the promotion by:

deleting an existing promotion price of an involved article based on the updated inventory data without obtaining approval via an approval procedure, and reactivating the promotion price of the involved article including recreating the deleted promotion price based on the updated inventory data that reflects an increase in the inventory of the involved article;

wherein the reactivating occurs without obtaining approval via the approval procedure and the reactivating being based on operational requirements;

storing by the one or more processors at least one of the first price planning schedule, the price planning input, and the price planning budget;

wherein the cash register is configured to automatically implement at least one price change based on the first price planning schedule;

wherein the first price planning schedule is configured to include a first inventory data and a first timing data;

wherein the cash register is configured to implement the at least one price change based on at least one of the first inventory data and the first timing data; and wherein the automated pricing engine includes a promotion management engine and at least one of a slower seller management engine and the manual pricing engine.

2. The method of claim 1, further comprising transmitting at least one of a first updated sales data and a first updated inventory data from at least one cash register to the price planning workbench.

3. The method of claim 2, further comprising generating a second price planning schedule based on the first updated sales data.

4. The method of claim 3, further comprising transmitting at least one of the second updated sales data and a second updated inventory data from the at least one cash register to the price planning workbench.

5. The method of claim 3, further comprising adjusting the price planning budget based on at least one of the first price planning schedule and the second price planning schedule.

6. The method of claim 5, further comprising determining whether the price planning budget is within the predetermined tolerance after adjusting the price planning budget based on the second price planning schedule.

7. The method of claim 3, wherein generating the second price planning schedule is further based on the first updated inventory data.

8. The method of claim 7, further comprising transmitting at least one of the second updated sales data and the second updated inventory data from the at least one cash register to the price planning workbench.

9. The method of claim 8, further including determining whether the price planning budget is within the predefined tolerance after adjusting the price planning budget based on at least one of the first price planning schedule and the second price planning schedule.

10. The method of claim 8, further including displaying an effect of the one or more price changes on the price planning budget to the user.

11. A system for generating a price planning schedule, comprising:

a user interface device configured to display a price planning input from at least one of an automated pricing engine and a manual pricing engine;

a price planning workbench configured to generate via one or more processors a first price planning schedule based on the price planning input and a price planning budget associated with the price planning input, the price planning workbench being configured to determine via one or more processors whether the price planning budget is within a predetermined tolerance after adjusting the price planning budget based on the first price planning schedule, the price planning workbench further configured to transmit the first price planning schedule to at least one cash register based on the price planning budget being within the predetermined tolerance, the price planning workbench being configured to receive updated sales data and updated inventory data from the at least one cash register; and wherein the price planning workbench is configured to modify via one or more processors a promotion by adding an article to the promotion and changing a sales price of the promotion, the price planning workbench further configured to modify via one or more processors the promotion by at least one of deactivating individual sale prices of the promotion, the deactivating individual sales prices of the promotion includes:

deleting an existing promotion price of an involved article based on the updated inventory data without obtaining approval via an approval procedure, and reactivating the promotion price of the involved article including recreating the deleted promotion price based on the updated inventory data that reflects an increase in the inventory of the involved article;

wherein the reactivating occurs without obtaining approval via the approval procedure and the reactivating being based on operational requirements;

a memory configured to store at least one of the first price planning schedule, the price planning input, and the price planning budget;

wherein the cash register is configured to automatically implement at least one price change based on the first price planning schedule;

wherein the first price planning schedule is configured to include a first inventory data and a first timing data;

wherein the cash register is configured to implement at least one price change based on at least one of the first inventory data and the first timing data; and wherein the automated pricing engine includes a promotion management engine and at least one of a slower seller management engine and the manual pricing engine.

12. The system of claim 11, wherein the price planning workbench is configured to receive at least one of a first updated sales data and a first updated inventory data from at least one cash register.

13. The system of claim 12, wherein the price planning workbench is configured to generate a second price planning schedule based on the first updated sales data.

14. The system of claim 13, wherein the price planning workbench is configured to receive at least one of the second updated sales data and a second updated inventory data from at least one cash register.

15. The system of claim 13, wherein the price planning workbench is further configured to adjust the price planning budget based on the second price planning schedule.

16. The system of claim 15, wherein the price planning workbench is further configured to determine whether the price planning budget is within the predetermined tolerance after adjusting the price planning budget based on the second price planning schedule.

17. The system of claim 13, wherein the second price planning schedule is further based on the first updated inventory data.

18. The system of claim 17, wherein the price planning workbench is configured to receive at least one of the second updated sales data and the second updated inventory data from the at least one cash register.

19. The system of claim 18, wherein the price planning workbench is configured to determine whether the price planning budget is within the predefined tolerance after adjusting the price planning budget based on at least one of the first price planning schedule and the second price planning schedule.

20. The system of claim 18, wherein the user interface is configured to display an effect of the one or more price changes on the price planning budget to the user.

21. A non-transitory program product for generating a price planning schedule, comprising machine-readable program code for causing, when executed, one or more machines to perform the following method steps:
receiving a price planning input from at least one of an automated pricing engine and a manual pricing engine;
generating a first price planning schedule based on the price planning input and a price
planning budget associated with the price planning input;
determining whether the price planning budget is within a predetermined tolerance after adjusting the price planning budget based on the first price planning schedule;
transmitting the first price planning schedule to at least one cash register based on the price planning budget being within the predetermined tolerance;
transmitting updated sales data and updated inventory data from the at least one cash register to a price planning workbench; and wherein the price planning workbench is configured to modify a promotion by adding an article to the promotion and changing a sales price of the promotion, the price planning workbench further configured to modify the promotion by at least one of deactivating individual sale prices of the promotion, the deactivating individual sales prices of the promotion includes:
deleting an existing promotion price of an involved article based on the updated inventory data without obtaining approval via an approval procedure, and
reactivating the promotion price of the involved article including recreating the deleted promotion price based on the updated inventory data that reflects an increase in the inventory of the involved article;
wherein the reactivating occurs without obtaining approval via the approval procedure and the reactivating being based on operational requirements;
storing in a memory at least one of the first price planning schedule, the price planning input, and the price planning budget;
wherein the cash register is configured to automatically implement at least one price change based on the first price planning schedule;
wherein the first price planning schedule is configured to include a first inventory data and a first timing data;
wherein the cash register is configured to implement the at least one price change based on at least one of the first inventory data and the first timing data; and
wherein the automated pricing engine includes a promotion management engine and at least one of a slower seller management engine and the manual pricing engine.

22. The non-transitory program product of claim 21, further comprising transmitting at least one of a first updated sales data and a first updated inventory data from at least one cash register to the price planning workbench.

23. The non-transitory program product of claim 22, further comprising generating a second price planning schedule based on the first updated sales data.

24. The non-transitory program product of claim 23, further comprising transmitting at least one of the second updated sales data and a second updated inventory data from the at least one cash register to the price planning workbench.

25. The non-transitory program product of claim 23, further comprising adjusting the price planning budget based on the second price planning schedule.

26. The program product of claim 25, further comprising determining whether the price planning budget is within the predetermined tolerance after adjusting the price planning budget based the second price planning schedule.

27. The program product of claim 23, wherein generating the second price planning schedule is based on the first updated inventory data.

28. The program product of claim 27, further comprising transmitting at least one of the second updated sales data and the second updated inventory data from the at least one cash register to the price planning workbench.

29. The program product of claim 28, further configured to determine whether the price planning budget is within the predefined tolerance after adjusting the price planning budget based on the second price planning schedule.

30. The program product of claim 28, further configured to display an effect of the one or more price changes on the price planning budget to the user.

* * * * *